US008491378B1

(12) United States Patent
Platis

(10) Patent No.: US 8,491,378 B1
(45) Date of Patent: Jul. 23, 2013

(54) REAL TIME PARIMUTUEL WAGERING SYSTEM AND METHOD

(76) Inventor: Harry Platis, Lynnwood, WA (US)

( * ) Notice: Subject to any disclaimer, the term of this patent is extended or adjusted under 35 U.S.C. 154(b) by 58 days.

(21) Appl. No.: 12/858,634

(22) Filed: Aug. 18, 2010

Related U.S. Application Data

(60) Provisional application No. 61/235,240, filed on Aug. 19, 2009.

(51) Int. Cl.
*A63F 13/00* (2006.01)

(52) U.S. Cl.
USPC .................... 463/25; 463/15; 463/40; 463/42

(58) Field of Classification Search
USPC .......................................... 463/15, 25, 40, 42
See application file for complete search history.

(56) References Cited

U.S. PATENT DOCUMENTS

| | | | |
|---|---|---|---|
| 5,374,060 | A | 12/1994 | Goldberg |
| 5,564,977 | A | 10/1996 | Algie |
| 5,746,657 | A | 5/1998 | Ueno |
| 5,749,785 | A | 5/1998 | Rossides |
| 5,830,068 | A | 11/1998 | Brenner et al. |
| 5,873,782 | A | 2/1999 | Hall |
| 5,957,775 | A | 9/1999 | Cherry |
| 6,004,211 | A | 12/1999 | Brenner et al. |
| 6,089,981 | A | 7/2000 | Brenner et al. |
| 6,099,409 | A | 8/2000 | Brenner et al. |
| 6,120,376 | A | 9/2000 | Cherry |
| 6,236,900 | B1 | 5/2001 | Geiger |
| 6,280,324 | B1 | 8/2001 | Tenenbaum |
| 6,309,307 | B1 | 10/2001 | Krause et al. |
| 6,347,086 | B1 | 2/2002 | Strachan |
| 6,358,150 | B1 | 3/2002 | Mir et al. |
| 6,383,074 | B1 | 5/2002 | Boggs |
| 6,450,887 | B1 | 9/2002 | Mir et al. |
| 6,508,709 | B1 | 1/2003 | Karmarkar |
| 6,544,121 | B2 | 4/2003 | Deweese et al. |
| 6,554,708 | B1 | 4/2003 | Brenner et al. |
| 6,554,709 | B1 | 4/2003 | Brenner et al. |
| 6,688,978 | B1 | 2/2004 | Herman |
| 6,695,701 | B2 | 2/2004 | Aronson et al. |
| 6,712,701 | B1 | 3/2004 | Boylan, III et al. |

(Continued)

OTHER PUBLICATIONS

NTRA Wagering Technology Working Group/Giuliani Partners LLC, "Improving Security in the United States Pari-Mutuel Wagering System: Status Report and Recommendations", Aug. 2003, accessed Jun. 16, 2008, <http://www.ntra.com/contenUWTWG_final_report.pdf>.

(Continued)

*Primary Examiner* — Pierre Eddy Elisca
*Assistant Examiner* — Shahid Kamal
(74) *Attorney, Agent, or Firm* — Matthew Jellett

(57) ABSTRACT

A wagering server system provides pari-mutuel wagering on a large number of entrants. The wagering server system has a wagering application which is configured for administration of pari-mutuel wagering. The application has a first tournament object which is configured to initialize into at least one first tournament component. The first tournament component represents in one embodiment a real world contested event which may have a large number of entrants. A sensory application interoperates with sensors located at the event. The sensors generate readable data digital signals when interoperating with readable data components. The wagering application also has a game play component which is configured to receive readable data digital signals, where real-time wagering may occur on the first real world contested event.

38 Claims, 15 Drawing Sheets

U.S. PATENT DOCUMENTS

| | | | |
|---|---|---|---|
| 6,786,824 B2 | 9/2004 | Cannon | |
| 6,811,488 B2 | 11/2004 | Paravia et al. | |
| 6,837,789 B2 | 1/2005 | Garahi et al. | |
| 6,837,791 B1 | 1/2005 | Mcnutt et al. | |
| 6,910,965 B2 | 6/2005 | Downes | |
| 7,070,499 B2 | 7/2006 | Ocampo | |
| 7,094,151 B2 | 8/2006 | Downes | |
| 7,172,508 B2 * | 2/2007 | Simon et al. | 463/42 |
| 7,311,606 B2 | 12/2007 | Amaitis et al. | |
| 7,452,274 B2 | 11/2008 | Amaitis et al. | |
| 7,510,116 B2 | 3/2009 | Robb et al. | |
| 7,742,972 B2 | 6/2010 | Lange et al. | |
| 7,775,880 B2 | 8/2010 | Downes | |
| 7,942,735 B2 | 5/2011 | Meyer et al. | |
| 8,142,279 B2 | 3/2012 | Benrus | |
| 8,277,311 B2 | 10/2012 | Platis et al. | |
| 2004/0029627 A1 | 2/2004 | Hannan et al. | |
| 2004/0198483 A1 | 10/2004 | Amaitis et al. | |
| 2004/0204245 A1 | 10/2004 | Amaitis et al. | |
| 2004/0229675 A1 | 11/2004 | Cannella | |
| 2005/0064934 A1 | 3/2005 | Amaitis et al. | |
| 2006/0252520 A1 | 11/2006 | Platis | |
| 2007/0026940 A1 | 2/2007 | Cannella | |
| 2007/0060308 A1 * | 3/2007 | Benrus | 463/25 |
| 2007/0197281 A1 | 8/2007 | Stronach | |
| 2008/0132314 A1 * | 6/2008 | Robb et al. | 463/17 |
| 2008/0248846 A1 | 10/2008 | Stronach et al. | |
| 2008/0274796 A1 * | 11/2008 | Lube | 463/25 |
| 2009/0036204 A1 | 2/2009 | Amaitis et al. | |
| 2009/0088232 A1 | 4/2009 | Amaitis et al. | |
| 2010/0029370 A1 * | 2/2010 | Robinson et al. | 463/25 |
| 2010/0203950 A1 * | 8/2010 | Frick | 463/22 |
| 2010/0304850 A1 * | 12/2010 | Gelman et al. | 463/25 |
| 2011/0256922 A1 * | 10/2011 | Amaitis et al. | 463/25 |
| 2012/0041819 A1 * | 2/2012 | Ramer et al. | 705/14.46 |
| 2012/0077571 A1 * | 3/2012 | Amaitis et al. | 463/25 |

OTHER PUBLICATIONS

PCT/ISA/210 International Search Report for PCT/US05/30568, 10 pages.

PCT/ISA/237 Written Opinion of the International Searching Authority for PCT/US05/30568, 13 pages.

* cited by examiner

REAL TIME PARIMUTUEL WAGERING SYSTEM AND METHOD

RELATED APPLICATIONS

This application claims priority benefit to U.S. Provisional Patent Application Ser. No. 61/235,240 filed Aug. 19, 2009. This application also incorporates U.S. patent application Ser. No. 12/472,344 filed May 26, 2009 and U.S. patent application Ser. No. 11/215,633 filed Aug. 29, 2005 by reference in their entireties.

DETAILED DESCRIPTION OF THE PREFERRED EMBODIMENTS

Figure 1:
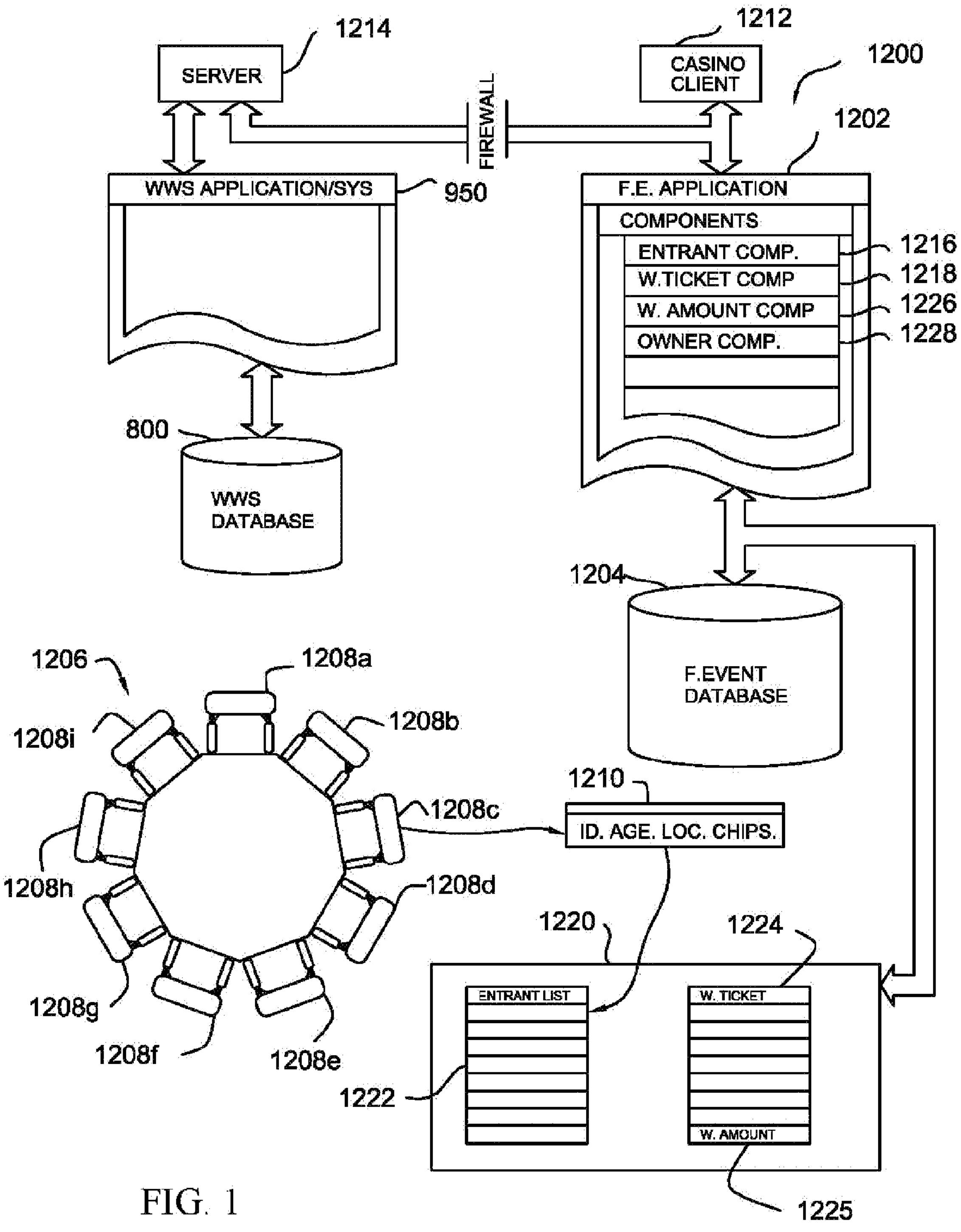
FIG. 1 is a schematic plan view of the wagering system.

What is herein provided is a final event pari-mutuel wagering system 1200 as seen in FIG. 28, where players or participants in a pari-mutuel wagering contest can bid on the entrants in a final event 1206. As previously discussed in the above applications which are incorporated herein by reference, the final event may be for example, the final table of the World Series of Poker, the final level in a billiard's tournament, or the quarterfinals or semifinals in a sporting event such as a tennis tournament, soccer tournament, football tournament, basketball tournament, baseball tournament, etc. Furthermore, the final event can be for an interim event within a tournament, such as the $2^{nd}$ game in a series, or it may be for a one time event not within a tournament setting.

In this present embodiment, the final event to be implemented within the final event pari-mutuel wagering system 1200 will be the final table of the World Series of Poker. Here the final table has in this particular embodiment, nine players or nine entrants 1208*a* through 1208*i*. The nine entrants are arranged about a nine sided table or a nonagon table.

The system includes as previously discussed (the incorporated by reference application) the wagering web service application 950, which interoperates with a wagering web service database 800. A wagering web server 1214 operates as a virtual total-stator system and provides for the interaction between the casino client 1212 in the wagering web server system 950. The software application which may be a customized land-based application to be maintained behind the casino client/server/firewall for security purposes, holds a plurality of components which among other items include a player object 1216, a wagering ticket 1218, a wager amount 1226, and an owner ID 1228.

The player component 1216 is a listing of the entrants 1208*a* though 1208*i* as previously discussed in the final event 1206. The player information is initially called from the player object 840 in the database 800. The wagering ticket component 1218 is called from the wager object 902 in the database 800 as seen in FIG. 20 of the prior application.

The wager amount component 1226 provides a listing of wagering price amount options for choosing a particular amount to wager by the player or the entrant in the final event.

The application or final event application 1202 interoperates with the final event database 1204 to maintain for accounting purposes among other casino specific reasons, the status of the pools as they are built prior to the closing of the bidding phase of the pari-mutuel wagering event, as well as information redundancy and unique wager ticket data information as it is accumulated during the bidding phase.

An instance of the final event application 1202 is executed for example on a kiosk or other type of wagering client 1220 (a client being a PC, laptop, handheld device such as a wirelessly enabled PDA, cell phone, iphone, or mini computer) which is located on the premises of the casino.

In this particular embodiment, the final event player list 1222 shows the final entrants in ranking of chip count. Here the final event player list or table 1222 includes the player or entrant ID, the entrant age, the entrant geographic origination location, and the entrant chip count, all of which are herein referred to as the entrant characteristics 1210.

It should be noted that this entrant characteristic information 1210 can also be sent from the casino client 1212 to the wagering web server 950 and the wagering web server database 800 for administration of the final event. This would occur prior to the beginning of the bidding phase of the pari-mutuel wagering on the final event, when the administrators set up the wagering events on the wagering web service overall system as previously discussed in the prior application.

Included in this particular embodiment on the same screen would be an instance of a wagering ticket 1224. The tickets include a plurality of fields which in this case are nine fields 1223, each for customized ranking 1 through 9 of the entrants at the final event in order of "finish" which in other words may mean the order in which the entrants at the final event poker table leave the table. Of course other "finishes" can be provided such as the first player or the first entrant to leave the table, the last two entrants to play at the table, the top three entrants to play at the table etc.

The player enters the wager amount 1225 which is presently enabled as a pull-down listing which may range from approximately $2.00 per ticket to approximately $2,000 per ticket depending upon the amount wished to be wagered. Of course a greater amount can be allowed by the administrator at the wagering web service system 950 as previously discussed in the prior application.

With, for example, the final nine entrants at the final event 1206 of the World Series Poker, the un-handicapped odds for choosing the final winner may be 9 factorial:1 or in other words. 362,880:1. Copies of each wagering ticket 1224 are stored in the final event database 1204, sent to the Nevada State Gaming Commission Board (NSGCB), the ticket is printed with the unique GUID ID as previously discussed in the prior applications, and the administration wagering web service system 950 maintains a copy of the wagering ticket information in the wagering web service database 800.

Figure 2:
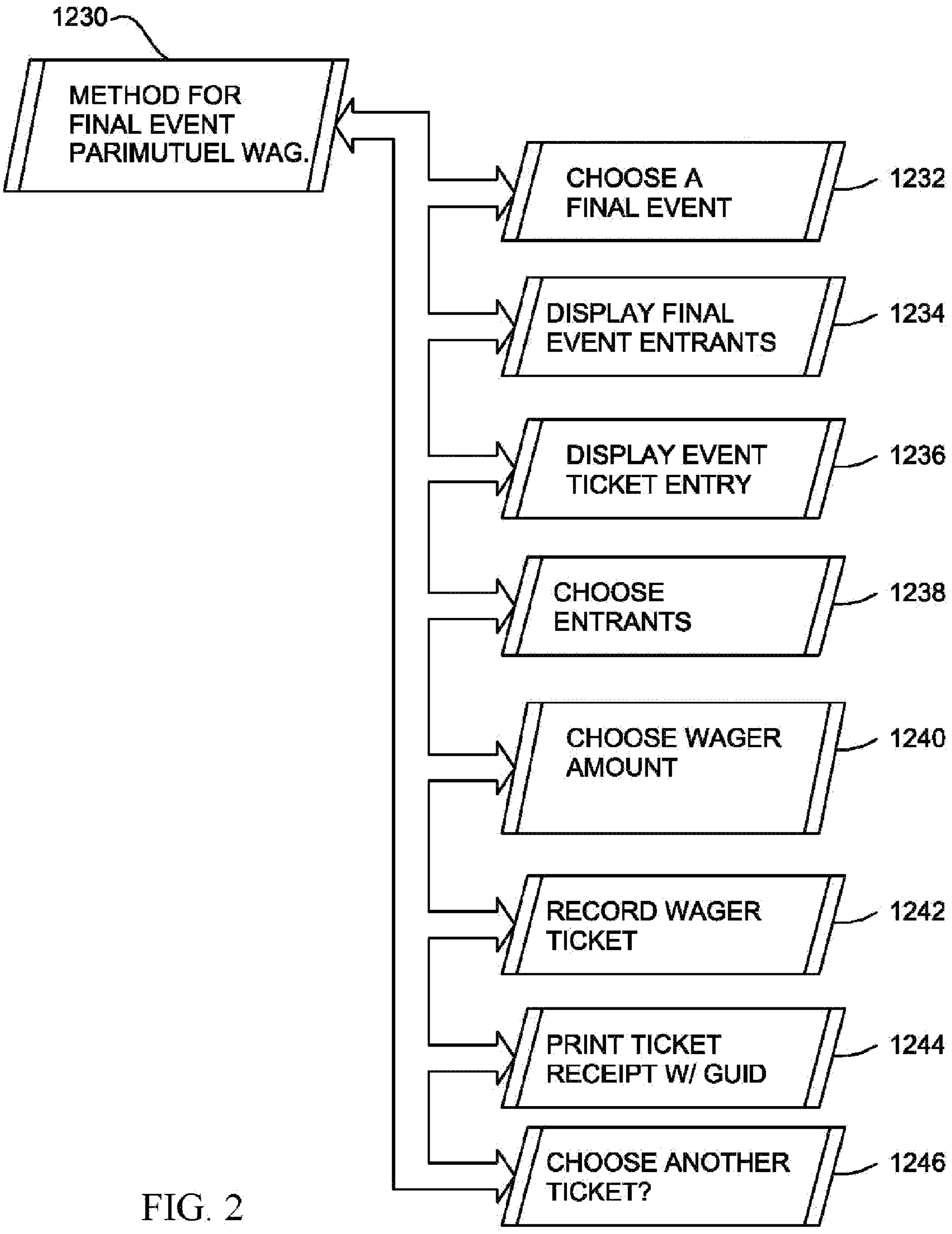
FIG. 2 is a schematic flow chart of a method for using the wagering system.

A discussion will now be provided of the method for final event pari-mutuel wagering 1230 as seen in FIG. 2. Overall, the steps include choosing a final event at step 1232, displaying the final event entrants at step 1234, and then displaying an event ticket entry at step 1236. Next the user can choose the entrants at step 1238 for ranking, choose the wager amount at step 1240, and record the wagering ticket at step 1242. The user will then be able to print the ticket receipt with the GUID at step 1244 and then choose another ticket for wagering at step 1246.

The player or user at step 1232 may be able to choose a final event from a listing of final events such as the final World Series of Poker table. As previously discussed, the final event World Series Poker table 1206 would have the entrant characteristics 1210 listed within the final events player list 1222 showing say, for example, a kiosk, where the player can view the current ranking of the players or entrants, and make a proposed finish list occurring at the final event and place this information into the wagering ticket 1224 fields 1223.

At step 1234, the final event entrants are displayed as previously discussed in the kiosk where the entrant characteristic information 1210 is called from the casino database or final event database 1204 which is then executed on the casino application or casino service final event page displayed in the kiosk or wagering client 1220.

At step 1236, the event ticket entry is displayed on the kiosk or wager client 1220 in this particular embodiment in tandem with the final event entrant list 1222. The event ticket entry 1224 is executed from the client or casino application or casino service final event application 1202 which itself calls the details of the wagering ticket for the particular pool from the pool object in the wagering web service database 800 hosted on the wagering web server 1214.

After the player chooses the entrants at 1238 and ranks their proposed finish, the player will choose the wagering amount at 1240, and then record the wager ticket at step 1242. This information is re-corded into the casino service database 1204 and the wager ticket details are sent to the wagering database 800 on the wagering web server 1214.

The player can then print the ticket receipt with the GUID 1244 which is correlated to that unique particular ticket as previously discussed in the prior applications incorporated herein by reference.

Figure 3:
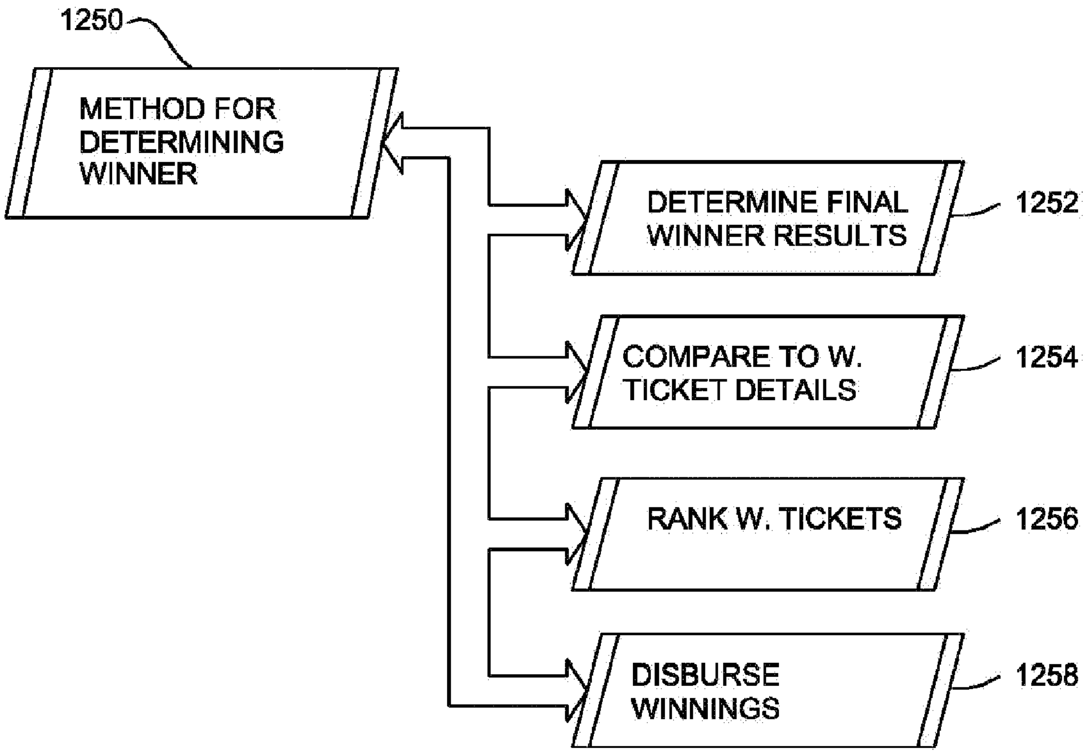
FIG. 3 is a schematic flow chart of a method for determining the winner.

Once the bidding phase is closed and the event has taken place, a method for determining the winner at step 1250 as seen in FIG. 3 is utilized. Here the casino application 1202 determines the final results at step 1252 and posts these final results to the wagering web server 1214. The final results are then compared to the wagered ticket details at step 1254. The player who has the most "winners" in the allotted fields is determined the winner of that particular pool.

In other words, at step 1256, the administration application or wagering web server system 950 ranks the wagering tickets based on the most correct entrant finish placement positions. In the case of a tie, the wagering pool is divided evenly among the players who have chosen the same number of entrant finishers. In one embodiment, there will be no carry-overs.

The winnings are dispersed at step 1258 and the final event application 1202 displays the winning amounts and the winning player while notifying all others that the event is closed.

Figure 11:
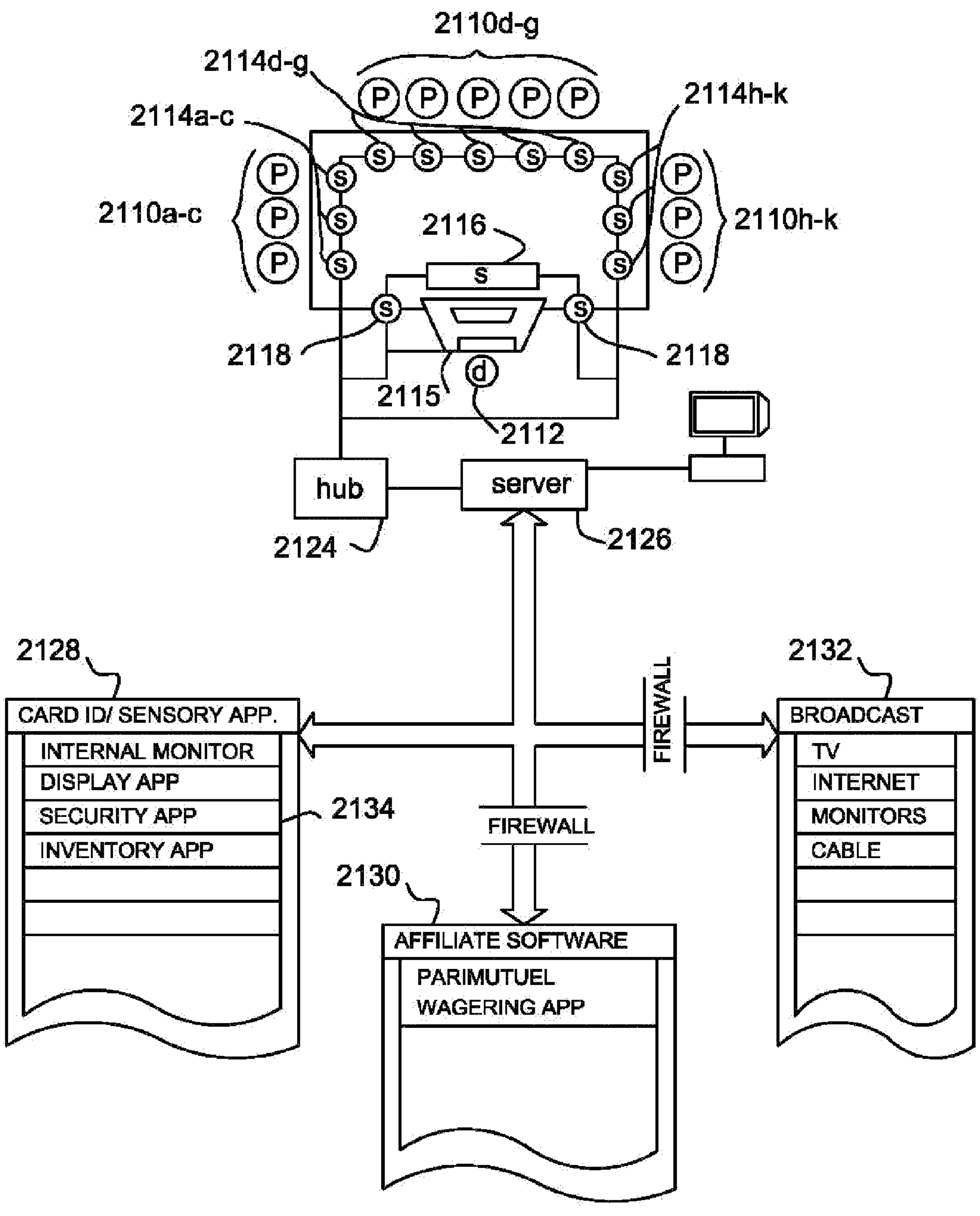
FIG. 11 is a schematic plan view of a sensory system in a game environment.
Figure 11A:
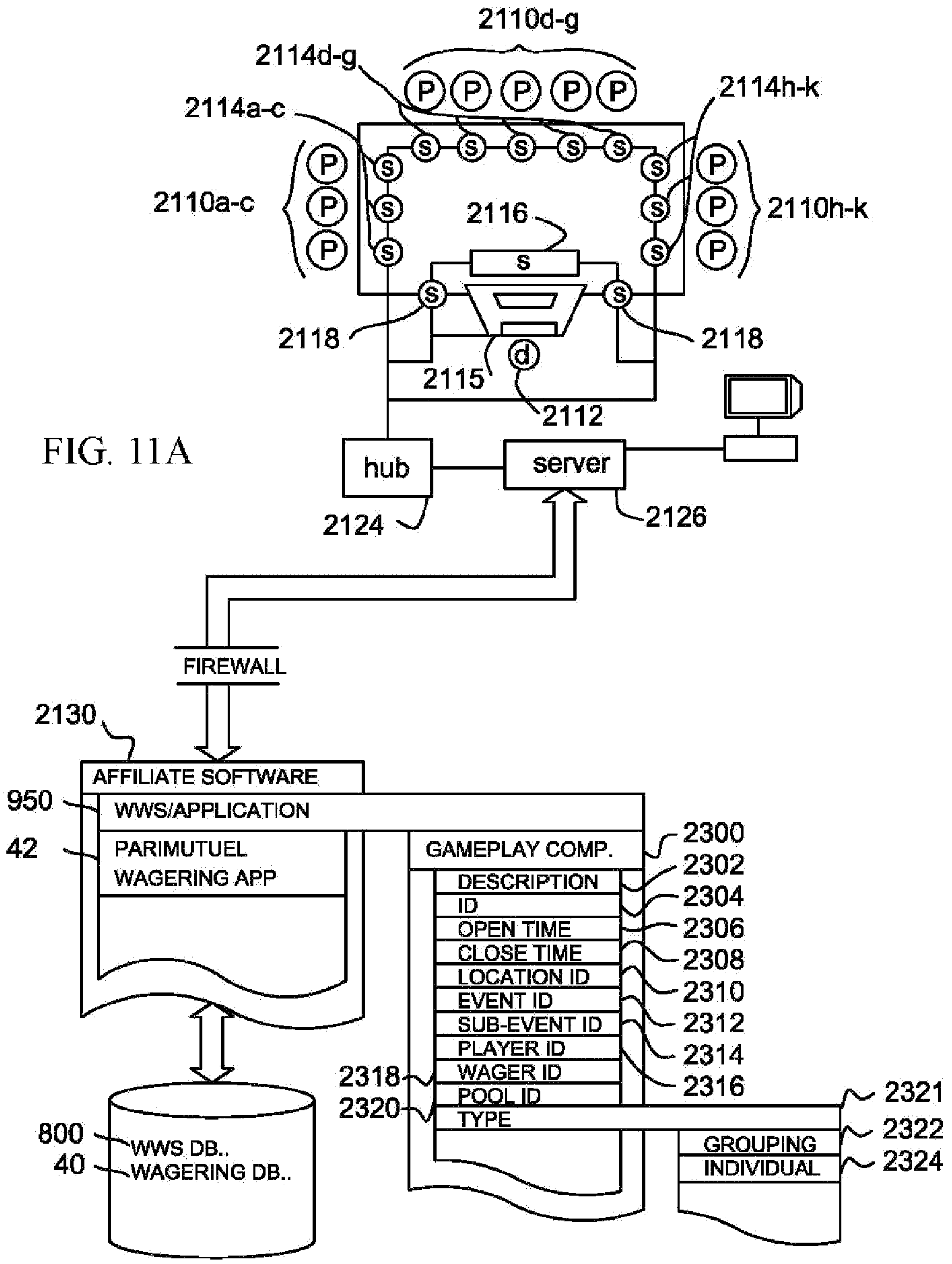
FIG. 11A is a schematic plan view of a wagering application interoperating with the sensors in a game environment.

To provide for real-time monitoring of game play events as they unfold, the wagering application 42 as seen in FIGS. 11 and 11A, interoperates with the wagering Web service application 950 and the sensory application 2128 in order to interoperate with the tracking or sensor mechanisms associated with the event. For example, the real-time monitoring enables wagers to be made on basic game play events as they unfold. This may include, for example, in a poker playing tournament, wagers on the outcome of a particular hand, the outcome of a particular deal, the outcome of a particular game, the outcome of a particular discard, or other event which may occur during the real-time play of the game. This enables spectators of the event who may have familiarity with the particular event to wager on the likely outcome of a particular event or sub event occurring within the game. These games of skill enable outside spectators to make informed judgment calls in wagering on the events. In other words, the more familiar an individual is with the particular event, the more likely they are to make a wager which has a successful outcome based on their knowledge of the game.

The wagering Web server application 950 will include a game play component 2300. The game play component has a corresponding game play database field which resides within the wagering Web server database 800. The game play component has a number of attributes or sub-components which enables the game play component to adequately reflect the real-time conditions of the game objects within the event. The game play component includes a description component 2302 for describing the particular game play component being modeled. An accounting ID component 2304 for tracking within the database and monitoring of the correlated object in the event. An open time component 2306 which records the time that the game play component was entered into the event. A close time component 2308 which also records the time that the gameplay component exited the event. A location ID component 2310 which is for assignment purposes to either a player ID component 2316 or a physical location such as a table in the casino, or other location such as a URL for a virtual web gaming site. The event ID component 2312 which identifies and correlates the gameplay component 2300 to the particular event which is being wagered upon or monitored. A sub event ID component 2314 which may be, for example, the event of an outcome of a particular hand, the event of an outcome of the particular pool shot, the event of an outcome of a particular race stage, or any other type of sub event which occurs during the main event of the game.

A brief example will be discussed in regards to the event and sub event correlation. For example, the poker game event may be the previously discussed nonagon nine event. The sub event may be the change in overall chip count of one particular player, the likelihood of a particular player to fold or bluff in a particular stage of the game, the likelihood of the player to up the ante in a particular stage of the game, the likelihood of the player to call etc.

Additionally, the game play component 2300 also includes a wager ID component field 2318 which correlates to the wager ID 904 in the wagering Web server database 800. The game component also has a pool ID component 120 which correlates to the pool ID object 872 in the wagering Web server database 800. In addition, the game play component also includes the game play component type 2321. The game play component type is essentially an indication if the game play component is a class of sub game play component or as an actual game play component item or object. For example, the game play component 2300 may be a deck of cards. If this is the case, then the game play component must create a game play component grouping 2322 which affiliates the individual card components of the deck to the deck game play component for accounting purposes. Each of the individual card components would initialize onto the individual game play component type 2324, while the deck itself would initialize under the game play component grouping type 2322.

The game play component objects are configured to receive data from the event that is being hosted at the location. In order to more fully describe this, a discussion of the data generated at the event will now be provided.

In order to properly track and display the card game as the game progresses, in one embodiment tracking and sensor technologies are utilized in order to identify which cards players have in their hands and which cards are either discarded or still within the deck so that additional wagering events can be made on the outcome of players hands during the game and also during the course of the pari-mutuel wagering event.

Accordingly, a detailed discussion of various embodiments of the interactive playing card 2010 as associated with the sensors which send and receive information from the readable data component described below will now be discussed.

Figure 4:
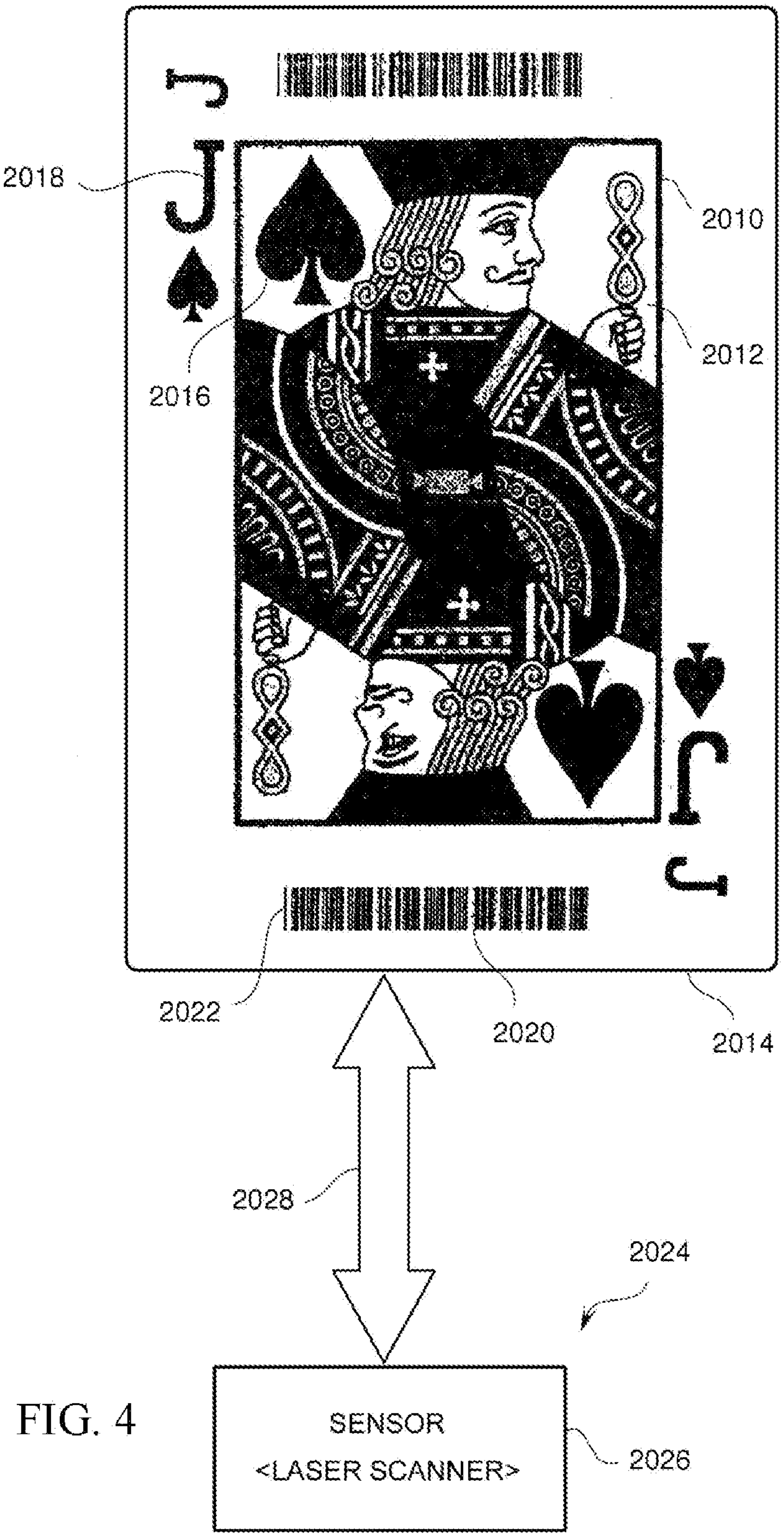
FIG. 4 is a plan view of an interactive playing card.

What follows is a discussion of the interactive playing card 2010 as seen in FIG. 4, which has one, two, or three dimensional bar codes or an RFID chip located or interoperating with the playing card. The bar codes and/or chip can be placed on the face of the card surface, embedded within the card surface, or layered between various stratums of the playing card.

The information to be transmitted to the sensor 2024, is contained within a readable data component 2020. The readable data component can be the bar codes as discussed above, the RFID tag, or a combination of the above to contain or maintain data during the use life of the card.

Referring now to FIG. 4, the interactive playing card 2010 is configured with the readable data component 2020. The readable data component 2020 in this particular embodiment is a one dimensional bar code 2022. A sensor 2024 can read the data component 2020 by, in this case, a laser scanner 2026. The readable data component 2020 maintains a suit card element 2016 and a face value card element 2018. These card elements are correlated to the suit of the card 2010 and the face value of the card 2010 as seen on the front face 2012 of the interactive playing card 2010.

The one dimensional bar code 2022 has encoded data or information as a two dimensional array of adjacent parallel rectangular bars with spaces of varying widths. As is generally known in the art, a bar code typically has identification data encoded within it; this ID data or key is used by the computer. The computer receives the laser scanner 2026 information such as the infrared laser signal 2028, to query the database and correlate the ID with the associated record information within the database. For example, a bar code found on a loaf of bread does not contain the product name, type of bread, or price. Instead it contains a digit product number. When the bar code is scanned at the checkout, it is transmitted to the store's computer, which finds the record associated with that item number in the database. The matching item record contains information such as a description of the product, vendor name, price, and quantity on hand. One dimensional symboligies include UPC\EAN, code 39, code 2128, interleaved 2 of 5 and Post NET. Code 2128 and interleaved 2 of 5 are popular in the transportation industry. One dimensional bar codes are read by a sweeping of a small spot of laser lights (which may be an infrared laser) across the printed bar code symbol. A human eye will only see a thin red line emitted by the laser scanner; however the scanner light source is absorbed by the dark bars and reflected by the light spaces. This light signal 2028 is then read by the sensor 2024 and converted into an electrical analog signal. The digital filter in the scanner then converts the analog electrical signal into a digital signal, which is then interpreted by software as the item number.

A one dimensional bar code item number is analogous to a serial number. By itself, serial numbers are not particularly valuable. However, when combined with, as discussed below, an inventory database, and tracking stations, the serial number becomes valuable because the company's enterprise systems can derive information from the data collected about what the product is and where the product was last scanned.

This derived information can then be used to feed the downstream supply-chain applications that rely on the product flow information. The one dimensional bar code represents unique identifiers like a serial number, but it can also represent a class of items such as a part number. Identifying unique items, classes of items, or both is a conceived embodiment of the one dimensional bar codes as used in this particular embodiment. The one dimensional technologies are tethered to the enterprise system which they read into. As the number of partners using the ID increases, the number of disparate enterprise systems increases and thus the information exchange costs proportionally increase.

With the use of the one dimensional bar code technology, granular data is developed and/or generated with regard to the approximate locations of the product within the distribution chain. The one dimensional bar code 2022 located on the interactive playing card front face 2012, enables the producers of the interactive playing card 2010 to integrate and track the card as well as card decks while using mature supporting technologies i.e. the bar code scanning technology. While discussion of the barcode 2022 has been on the front face of the playing card, the bar code can be placed on the back face 2014, integrated into the graphics of the card, or added on to the edge of the interactive playing card 2010.

Figure 5:
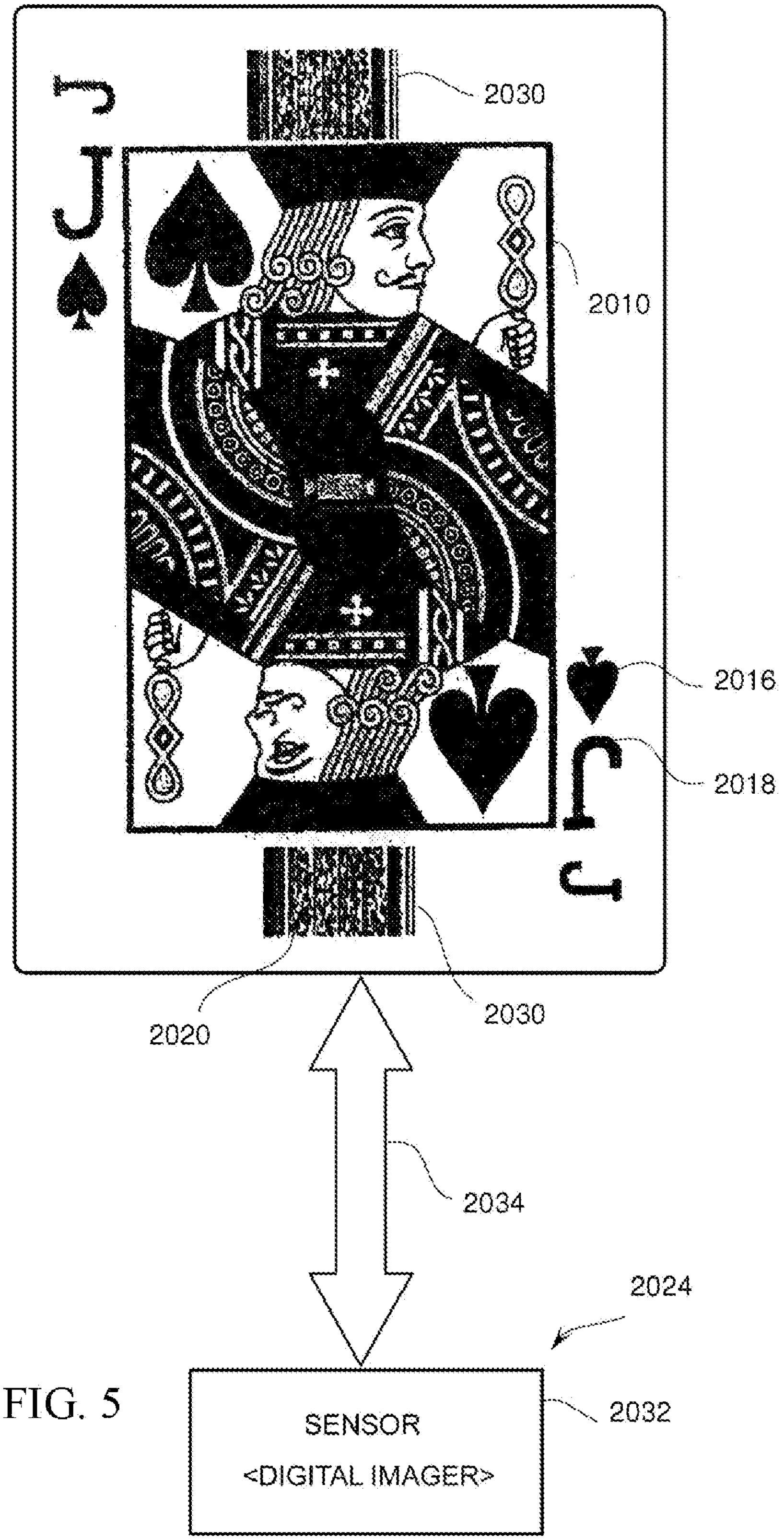
FIG. 5 is a plan view of an alternative embodiment of the interactive playing card.

Referring to FIG. 5, the interactive playing card 2010 utilizes a readable data component 2020 which in this case has a two dimensional bar code 2030. The two dimensional bar code also maintains the existing face value card element 2018 and the suit card element 2016. In addition to the previously mentioned data element, additional data components also include a client element where the client may be a casino, or a particular server location with a discreet domain. Also, a printer element which records the particular printer used to generate the data component, a card deck element which can be a serial number representing the unique actual card deck the playing card belongs to, an assigned table element, which may be correlated to the table using the pack or the deck when that particular deck is opened upon first use or subsequent uses, an assigned card game element which is correlated to the games being played at the particular table when the pack is initialized for use. A number of deals per deck element sets the number of times that the deck can be used before the deck is retired. Also, a date the deck is retired element can be correlated to the card deck element serial number for tracking within the system.

A card deck in inventory element correlates the card deck to the other card decks within the inventory.

Also, a date of destruction element can be correlated to the serial number element when the card deck is taken out of inventory and destroyed. Further, a date of sale of used deck element can be assigned and correlated to the serial number element when the deck is sold and taken out of use by the client.

The above information can be encoded or correlated to the two dimensional bar code 2030 because of the two dimensional matrix symbology enabled by the horizontal and vertical axial components of the 2D matrix. Each two dimensional matrix code 2030 is created as a matrix of square elements, each element being either white or black which enables the printer to generate and encode data as binary code. This allows for a very large amount of data to be correlated with the matrix symbol and along with extensive error detection and correction codes, the information can be coded in a very small amount of space.

The 2D matrix bar code 2030 is read with a digital imager. This permits very fast data collection by capturing the entire symbol at once, because the sensor can recognize the two dimensional bar codes pattern of cells contained within the matrix. The cells can be square, hexagonal or circular in shape. This data is encoded relative to various horizontal and vertical positions as well as light and dark areas. Encoding schemes use error detection and correction techniques to improve reliability, and enable reading of partially damaged symbols. Two dimensional bar codes are generally used where between 10-20 data characters are desired for recordation of information. As discussed above, the 2D bar code 2030 enables additional information beyond the one dimensional bar code as seen in FIG. 4, while still maintaining the two dimensional bar code on the surface of the playing card 2012.

Figure 6:
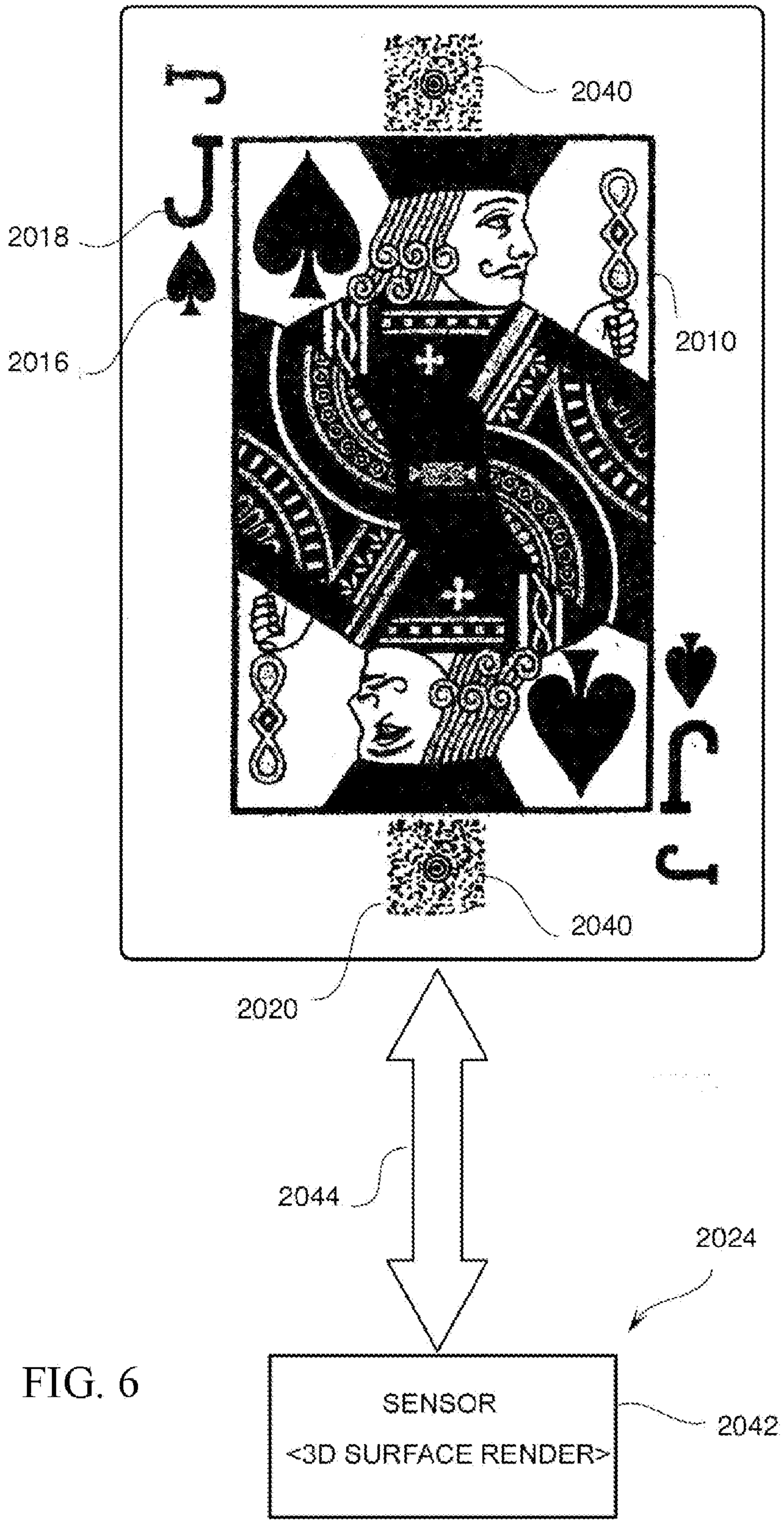
FIG. 6 is a plan view of an alternative embodiment of the interactive playing card.

Referring to FIG. 6, a three dimensional bar code 2040 is used on the interactive playing card 2010 and interoperates with a sensor 2024 which in this particular embodiment is a three dimensional surface reader. The three dimensional bar code 2040 or in other terms called a 'bumpy' bar code, maintains also the suit card element 2016 and the face value card element 2018 which are correlated to the playing cards suit and face values. The previous additional information included in two dimensional bar codes, as seen in FIG. 5, can also be recorded within the three dimensional bar code 2040. The sensor 2024 as previously discussed is a three dimensional surface reader 42 and reads the bar code 2040 which is directly embedded within the card 2010. The signal 2044 is a surface sensing signal which is read by the 3D surface reader 42.

Represented by highs and lows at surface height, similar to Braille, as well as indentations, contours, casts, penned, etches, stamped, molded or embossed three dimensional codes are embedded into the card 2010. The 3D bar code 2040 enables the user to collect data in environments where the black-and-white bar coding technologies are ineffective. Permanent marking of components is enabled, in this case the playing card 2010, generating increased tracing capabilities. In the present technology, the 3D bar code 2040 allows the playing card surface 2012 to avoid having additional ink visible on the surface of the card, and the 3D bar code works the same software data transfer as the one dimensional bar code 2022 (FIG. 4).

Figure 7:
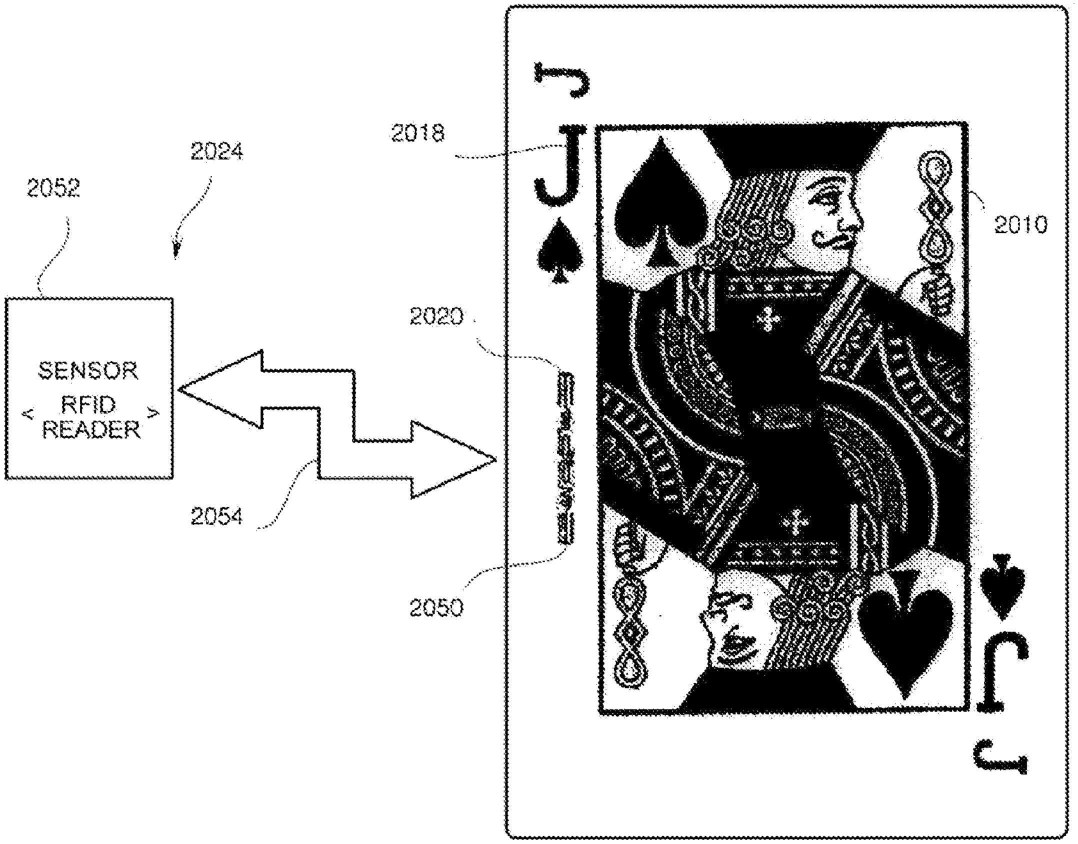
FIG. 7 is a plan view of an alternative embodiment of the interactive playing card.

Referring to FIG. 7, a radio frequency ID tag 2050 is attached to the interactive playing card 2010. The readable data component 2020 or in other words the radio frequency ID tag 2050, maintains the suit card element 2016 and face value card element 2018 of the playing card suit and face value. Due to the large amount of data which can be maintained by RFID tag 2050, additional information can be maintained within the circuit. The small radio frequency ID chip 2050 is read by a sensor 2024 which in this case is an RFID reader or scanner 2052. The scanner interprets the card suit element 2016 and the face value element 2018 via the software which interoperates with the sensor 2024. Radio frequency ID is a capture technology that uses small data carrying tokens or tags, and fixed or mobile scanners or in other words the readers.

The tags are attached to or embedded into objects to be identified and/or scanned. The RFID tags can be active or passive. In alternative embodiments, the RFID tag 2050 may be an active tag, a passive tag, or in a passive sense, a Nano tag which is an RFID chip built at the micron level.

The active tag includes a battery of some sort, while the passive tag obtains energy from the radio frequency signal 2054 sent from the interrogation unit 2052 or the reader 2052. The passive tag maintains the identification information or readable data components for the life of the tag. The active tag has a greater transmission range because of the power source maintained in operation with the active tag 2050.

The sensor 2024 or in this case the RFID reader 2052 is installed throughout for example, the casino such as within the playing table, above or below the playing table etc. Also, the reader 2052 may be portable. The data within the RFID tag 2050 is transferred between various distributed readers 2052 within a hosting environment via local area network or wireless area networks as discussed below.

The signal 2054 is a low-power radio frequency signal. In one particular embodiment, the RFID tags are embedded with custom integrated circuits to maintain the data. In general, using the RFID tags on items such as the playing cards 2010 enable the items to be tracked in real time and the items do not need to be handled by humans, i.e. the RFID tags can be polled by sending out interrogation signals and receiving the correlating response signal. This minimizes the time involved in the identification process of locating the cards 2010 and enables high integrity of the data.

In this current embodiment, still referring to FIG. 7 the RFID tag 2050 is embedded into the interactive playing card 2010 during the production phase of the card. The RFID tag enables the value of the card, suit of the card, and other data points to be transmitted through the RFID sensor 2052 into the operating software. In addition, RFID chips can be attached to the interactive playing cards 2010 after manufacturing of both the playing cards and the RFID tags 2050 during separate processes where bar code technologies would be less effective. Permanent marking of the playing card 2010, generates increased tracing capabilities.

The sensors 2052 as discussed more fully below are enabled to read the RFID tags 2050 and can be mounted on the playing surface of the gaming table, underneath the gaming table, or over the gaming table. With the use of RFID, deep visibility of real-time data is enabled for polling of the interactive playing cards 2010. The RFID tags 2050 and the packaging of the decks, allow for detailed data to track the items through the casino supply chain.

In this particular embodiment, the RFID tag 2050 enables additional integration with inventory control, accounting software, and data aggregation, collection, and/or dissemination of information to interested third parties. Using the RFID tag 2050, real-time polling enables the existing database to keep track of the existing inventory of cards, and avoid the use of inventory cycle counts.

Figure 8:
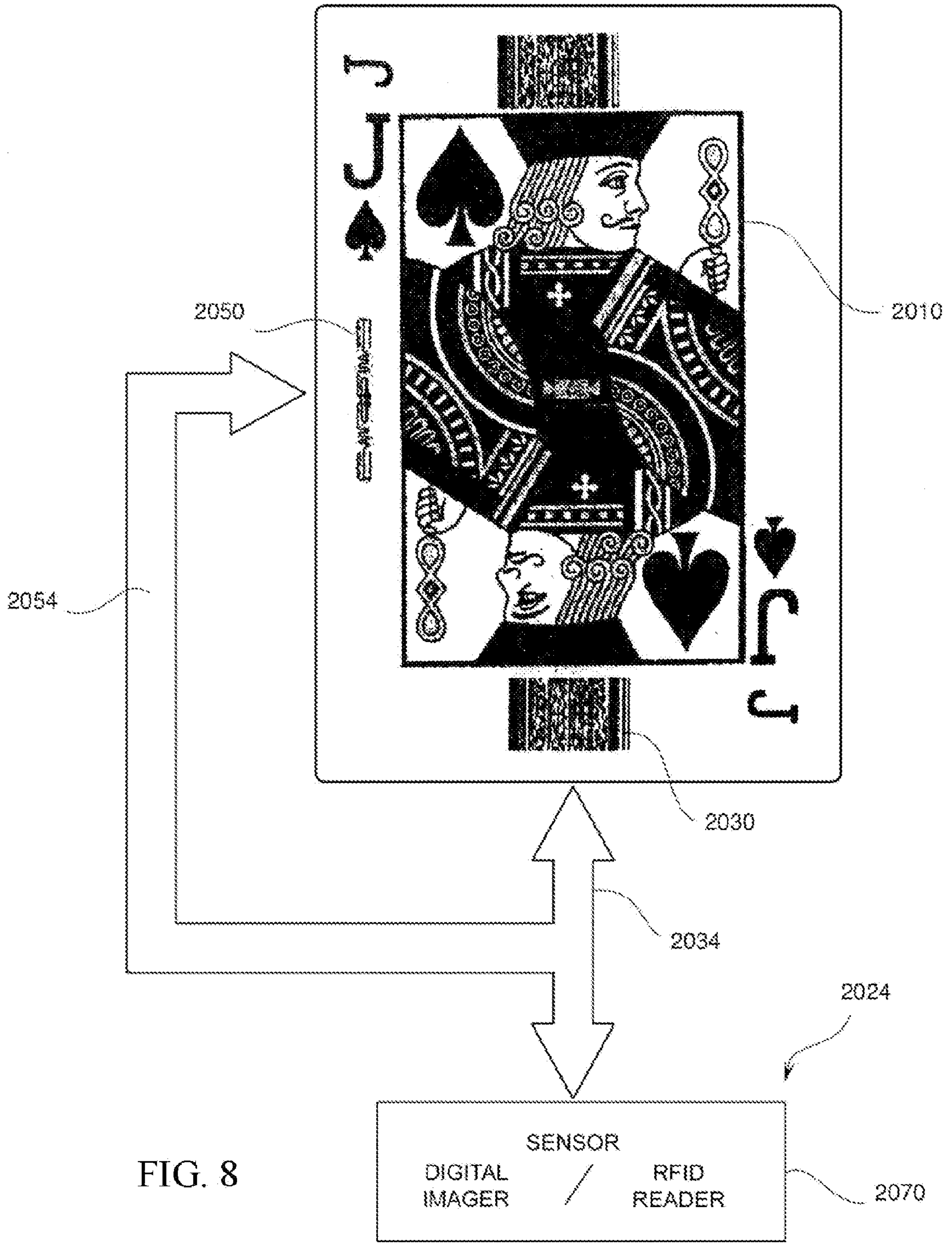
FIG. 8 is a plan view of an alternative embodiment of the interactive playing card.
Figure 9:
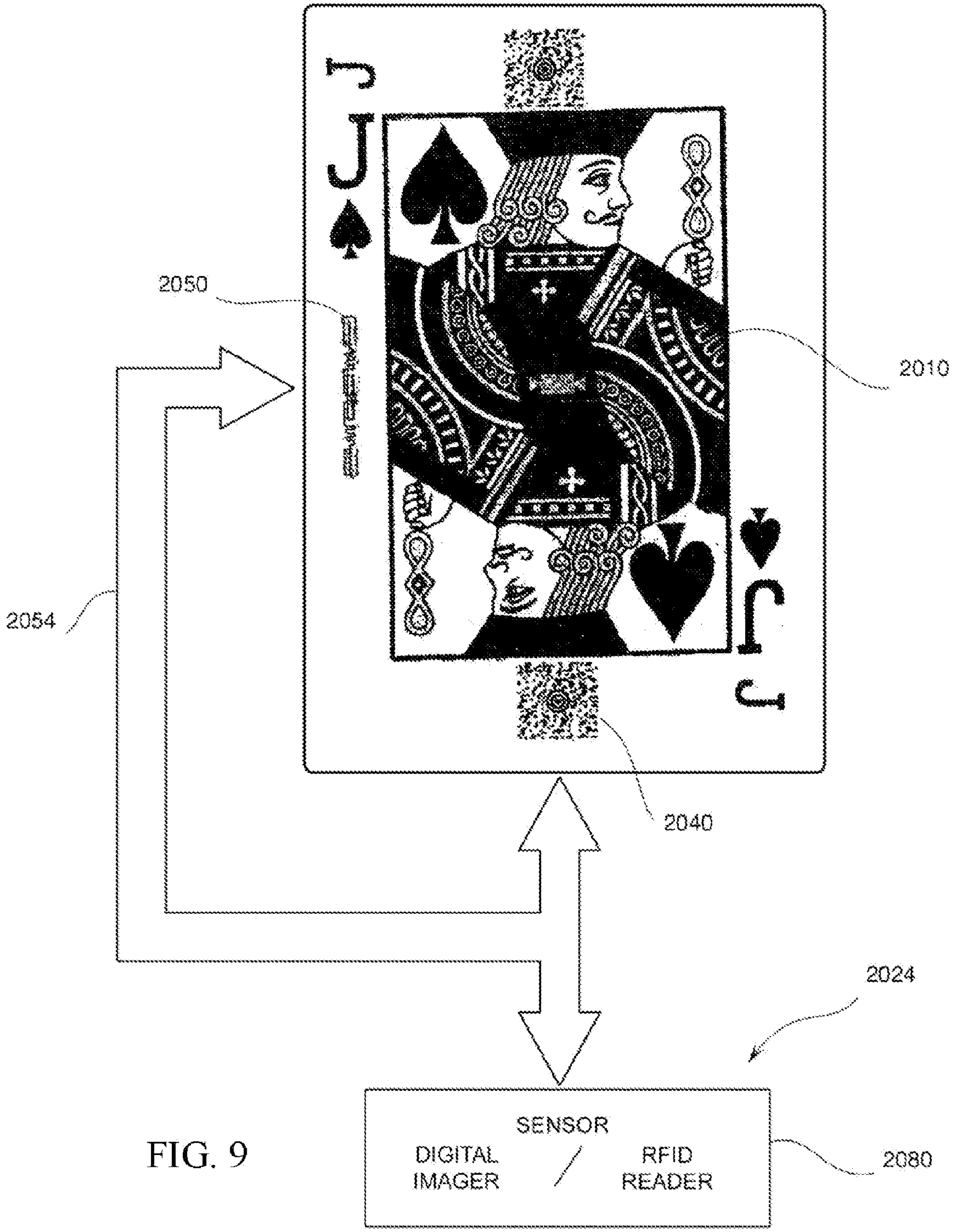
FIG. 9 is a plan view of an alternative embodiment of the interactive playing card.
Figure 10:
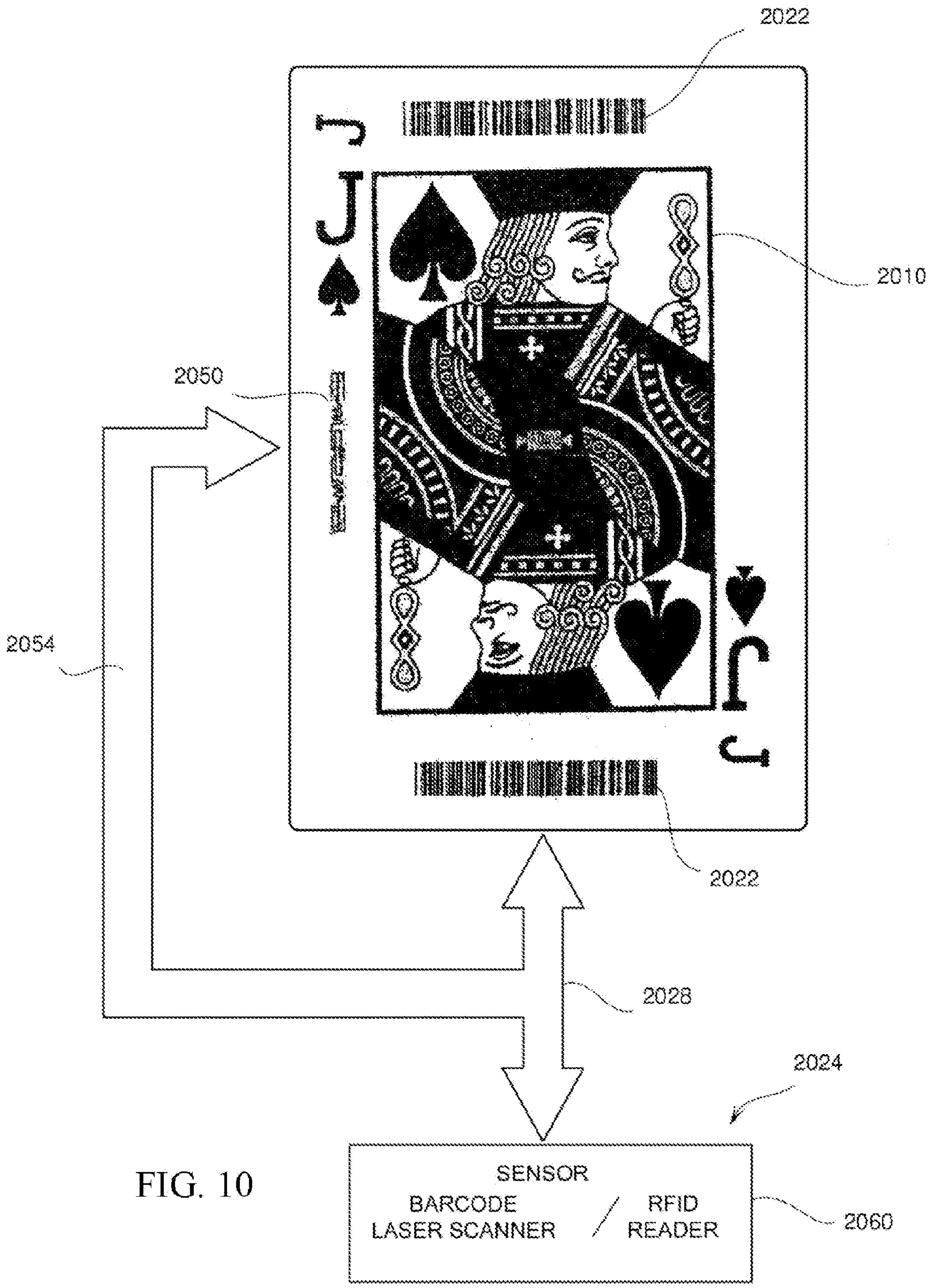
FIG. 10 is a plan view of an alternative embodiment of the interactive playing card.

Referring to FIGS. 8-10: the readable data components can be applied to the interactive playing card 2010 independently or combined to realize various combinations and sub combinations of data aggregation and scanning depending on the existing capture system, i.e. the bar code scanners or the RFID readers. For example, referring to FIG. 10, a composite sensor 2024 incorporates the use of a laser scanner and an RFID reader 2060, and receives two separate signals, the RFID signal 2054 and the infrared laser signal 2028. On the interactive playing card 2010 are both the one dimensional bar code 2022 and an RFID tag 2050 which can be either passive or active depending on the desired metrics.

An alternative embodiment utilizes a sensor 2024 with a digital imager and RFID reader composite sensor 2070 as seen in FIG. 8. Here the two dimensional bar code 2030 and the RFID tag 2050 are interoperating with the interactive playing card 2010. Again the various signals such as the RFID signal 2054 and the image signal 2034 are read by the composite sensor 2070 to aggregate and track the various information in the respective readable data components.

Lastly, referring to FIG. 9, a three dimensional surface reader in combination with an RFID reader composite sensor 2080 receives the surface sensing signal 2044 and the RFID signal 2054 to read both the three dimensional bar code 2040 and the RFID tag 2050 maintained on the interactive playing card 2010.

As will be discussed below, the interactive playing cards 2010 operate in gaming environments, either live or online, as well as a combination of the two where the use of real playing cards is desired. The interactive cards 2010 are handled in the traditional manner and are required to be dealt by a live dealer or person, and are required to be shuffled etc. The sensor or sensors, maintained within the gaming environments translates the readable data component information maintained on the card to software maintained within the microprocessor environment which enables the gaming software to display the information maintained within the readable data component 2020 such as the face value element 2018 and the suit card element 2016 on either a screen at a client computer or on a monitor of some sort for spectators or guests to view.

The one dimensional, two dimensional, three dimensional, and RFID tags utilize the sensor 2024 mounted on the playing surface of the gaming table. The interactive cards 2010 are passed over the sensor 2024 and an indication signal which is either an audible beep, click, or indicator light, is activated for the dealer to ensure accuracy of the reading of the card.

Referring to FIG. 11, a sensory system 2100 is implemented to track the use of the interactive playing card 2010 as previously discussed during in one embodiment a playing card game within a casino. In this particular embodiment, a group of players 2110A-2110K are situated about a game table 2120. Correlated or placed in front of the individual players are playing card sensors 2114A-2114K. These sensors, which as previously discussed above, can be bar code sensors, or RFID sensors, which can be built into the game table, placed below the game table, placed above the game table, or situated around the edge of the game table. Also an additional embodiment would be to have the sensors as movable mats which are connected via WIFI or wireless local area network to the sensory relay hub 2124. In addition to the players, a dealer 2112 (who can also be a player 110), is situated at the game table 2120. The dealer utilizes a sensor which is a register sensor 2116 or a dealer sensor 2116. The dealer sensor 2116 is used by the dealer to register and/or scan new or old interactive playing card decks when used during game play.

During the course of the game, players may discard or fold certain interactive playing cards, and the dealer will pass these cards over a fold sensor 2118 which in this particular embodiment is placed on either side to the left or right of the dealer position 2112.

The dealer sensor 2116, the player sensors 2114A-2114K and the fold sensors 2118 are all connected, either wirelessly or via wire such as coaxial cable or the like to the server 2126 through the use of a sensor relay hub 2124. The dealer 2112 will run a client computer 2115 to initialize various game applications which will correlate with the interactive playing cards for example, the dealer may bring up a poker application on the client's computer 2115 which is initialized from the server 2126. The interactive playing cards 2010 from the interactive playing card deck which is initialized by the dealer sensor 2116, will interpret the suit card element 2016 and the face value card element 2018 maintained within the readable data component 2020 of the interactive playing card 2010 (FIG. 4), scanned by the various sensors, and correlate this information with the display software or application run by the card identification or card sensory application 2128.

As the game progresses, the readable data component 2020 information will be displayed in real time on various monitors and broadcast information or components 2132. Furthermore, affiliate software 2130 such as a parimutuel wagering application on large entrant groups, herein incorporated by reference as U.S. patent application Publication Ser. No. 2006/0252520 published Nov. 9, 2006, can monitor and display the game information which is occurring at the game table 2120 in real time enabling viewers to wager in parimutuel fashion on the entrants in the game.

Figure 12:
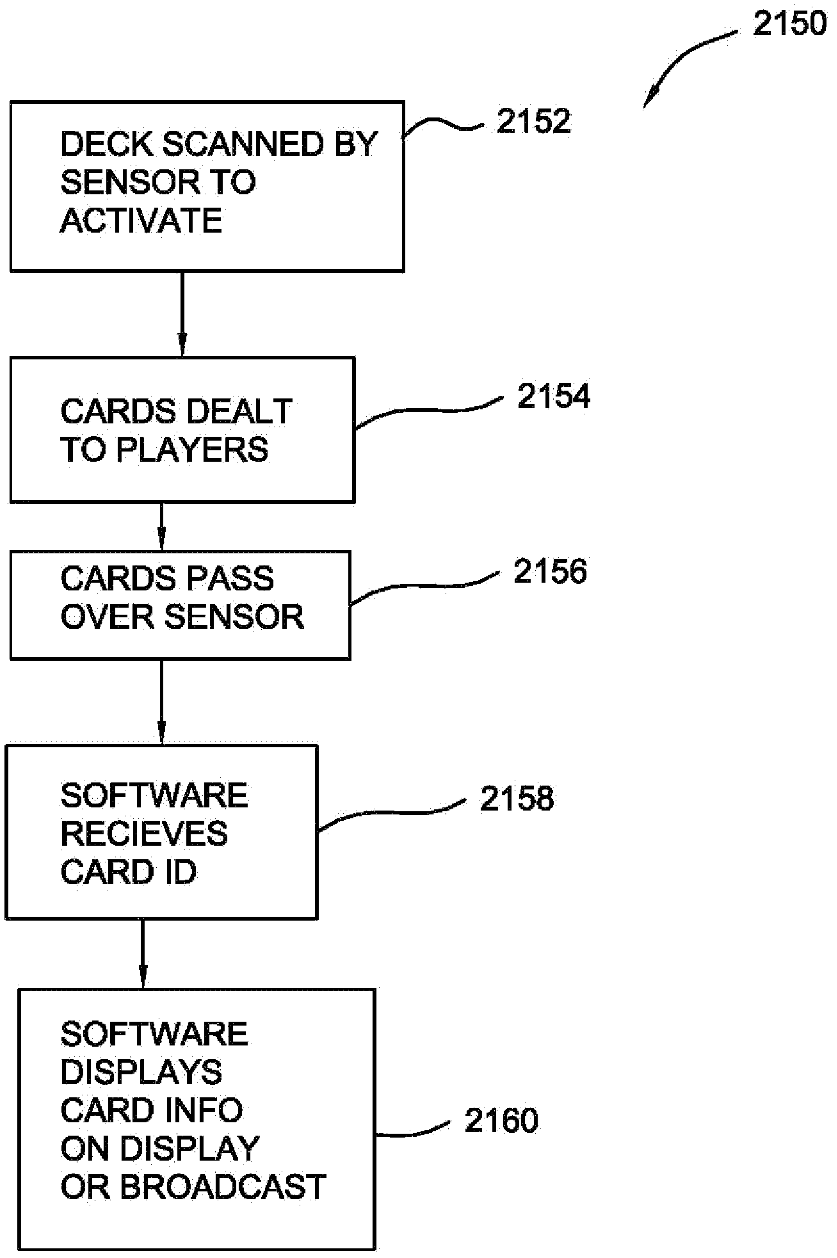
FIG. 12 is a flow chart to monitor interactive playing cards in a game.

Referring now to FIG. 12, a method to monitor the interactive playing card in a game will now be discussed. During game play or tournament play, the dealer at step 2152 scan the card deck with the dealer sensors 116 which registers the new deck with the card identification software or sensory application 2128 activating the deck for use in the game.

No matter what game, cards are generally dealt at step 2154 to the players by the dealer, the dealer either being a player or a designated house dealer. At step 2156, cards are dealt, passing over the player bar code or RFID sensors which register the interactive playing cards used by the players during the game which then can be displayed on the TVs and monitors or the viewing system components 2132.

In doing so, the software at step 2158 recognizes the individual interactive playing card readable data components 2020 as previously discussed in FIG. 4, and then at step 2160 the software sends the graphic signal to the display or broadcast.

Figure 13:
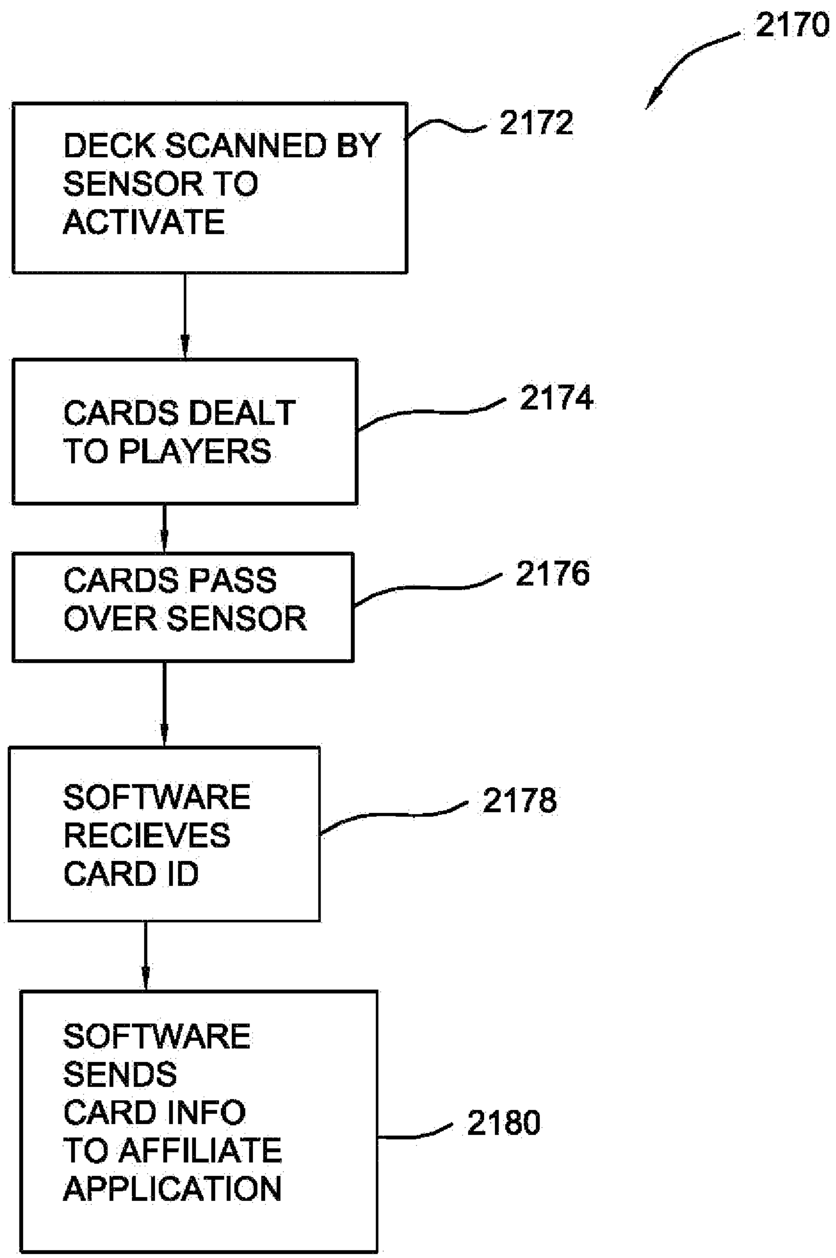
FIG. 13 is a flow chart to integrate the interactive playing cards with affiliate software.

During the scanning and monitoring of the decks and individual interactive playing cards, the sensors pass the digital information to the sensory application 2128 which is maintained on the server 2126 as previously seen in FIG. 11. Referring now to FIG. 13, a method for integration of interactive playing cards into the software application 2170 will now be provided.

The decks are scanned by the sensor at step 2172 and are activated as previously discussed in FIG. 12. Then at step 2174 again the cards are dealt to the players; at step 2176, the cards pass over the bar code or RFID sensor, the software at step 2178 recognizes the readable data component information and at step 2180 sends the readable data component information to affiliate software for display and/or use in additional applications including the previously mentioned parimutuel wager on large entrant groups in a tournament.

Figure 14:
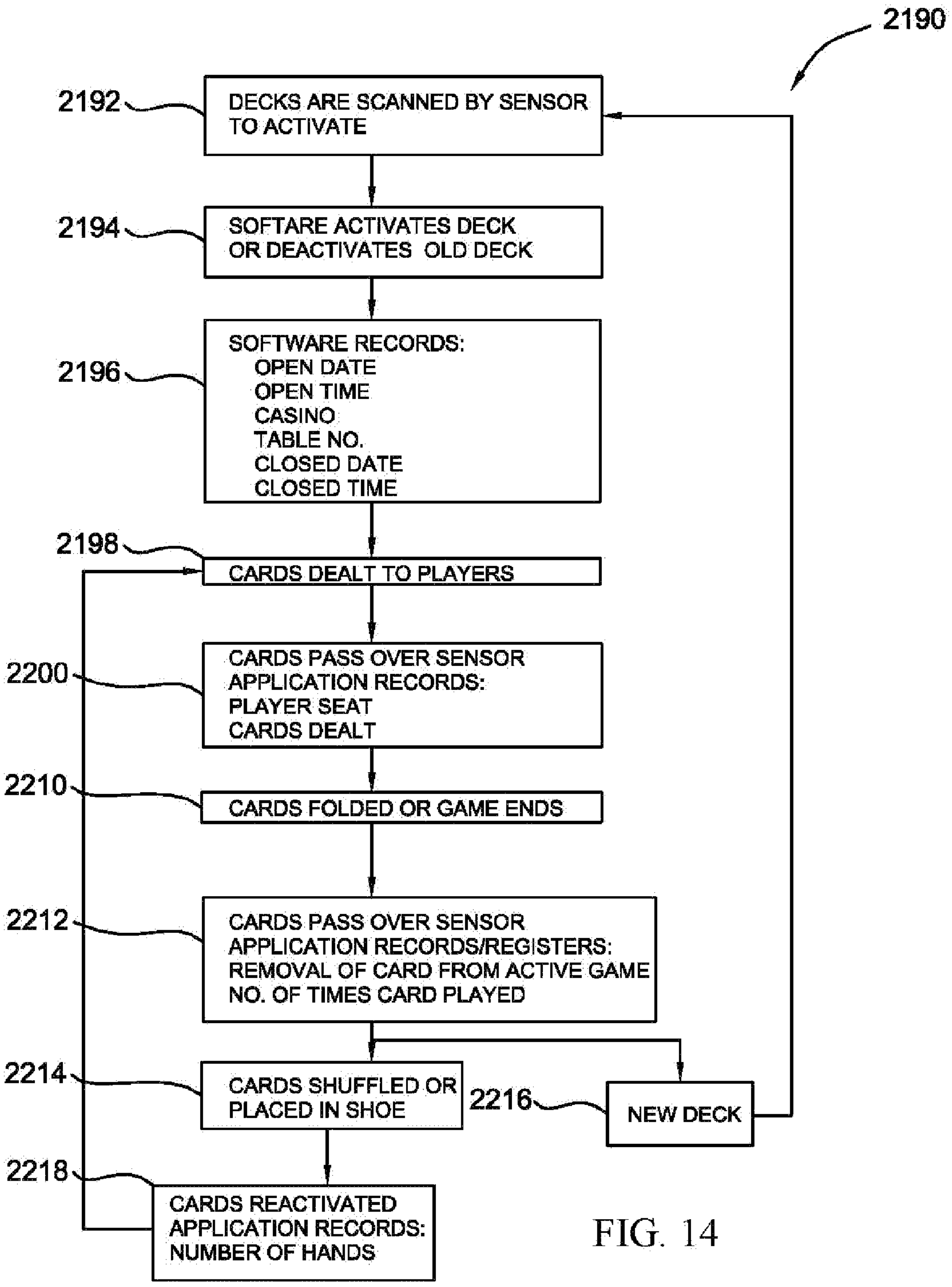
FIG. 14 is a flow chart to monitor the interactive playing cards for use in inventory.

While the interactive playing card can be monitored during the play of the game, the playing card can being monitored during the life cycle of the card and tracked through the card identification software or the sensory application 2128 through correlation with various databases and inventory applications 2134. Referring now to FIG. 14, discussion of a method to monitor interactive playing card inventory 2190 will now be provided. Even before the interactive playing card decks are delivered to the gaming location, the decks are manufactured and produced with the readable data component 2020 as seen in FIG. 4, which maintains the discreet data points correlating to the application inventory software 2134 which is usable through a distribution chain such as a UPC (uniform product code), or other bar code scan technologies. As the data points fill up within the inventory software 2134 which correlates to the particular item or serial code as previously discussed above, the information correlated with that code increases in value within the supply chain.

When the interactive playing card deck reaches the gaming area, the interactive play card deck is scanned by the sensor and activated at step 2192. The sensory application 2128 as seen in FIG. 11, or the card ID software, activates at step 2194 the deck or in the alternative deactivates the old deck. The sensory application 2128 at step 2196 records the date that the deck was opened, the time that the deck was opened, gaming location such as a casino at which the deck was opened, the table at which the deck was being used, the date at which the deck was closed out, as well as the time at which the deck was closed out. The dealer 2112 will provide some of the real-time information through the use of the client computer 2115 at the gaming table 2120 when interfacing with the card ID software 2128.

The dealer then deals the cards to the players at step 2198; the cards then pass over the sensor at step 2200 recording the player seat and the card dealt to the sensory application 2128. After the round is complete, the cards are folded or the game ends at step 2210.

Once the interactive cards are passed back to the dealer, the dealer at step 2212 will register the used cards over the bar code fold sensor 2118 (FIG. 11), and the sensory application 2128 records the removal of the interactive playing card from the active game, as well as the number of times the interactive playing card was used for inventory purposes.

The interactive playing cards at step 2214 are then shuffled back into the game play or placed into the shoe for reshuffling. The interactive playing cards are then reactivated at step 2218 for re-dealing, and at this point the number of hands the card has been played is recorded at the sensory application 2120. In the alternative, the dealer may decide to activate a new deck at step 216 which is then scanned by the sensor at step 2192 as previously discussed.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

Therefore I claim:

1. A wagering server system for providing pari-mutuel wagering on a large number of entrants, said wagering server system comprising:

a. a wagering application configured for administration of pari-mutuel wagering: said wagering application comprising a first tournament object configured to initialize into at least one first tournament component; said first tournament component configured to represent a first real-world contested event having a large number of entrants (LNE); said LNE comprising not less than about 16 entrants;

b. said wagering application further comprising a first player object, said first player object configured to initialize into a first plurality of player entrant components not less than said LNE in said first real-world contested event; each of said first plurality of player entrant components comprising player entrant attributes; each of said first plurality of player entrant components affiliated with said first tournament component;

c. said first set of player entrant components further comprising a first set of individual entrant components and a first set of group entrant components;

d. said player entrant attributes comprising: an age attribute, a location attribute, a ranking attribute, a pre-cuts odds attribute, a post-cuts odds attribute, an entrant I.D. attribute; a player ID game-play attribute;

e. a sensory application interoperating with a plurality of sensors located at said first real world contested event; said plurality of sensors configured to generate a plurality of readable data component digital signals when interoperating with a plurality of readable data components;

f. said wagering application further comprising a game-play component configured to receive said plurality of readable data component digital signals providing a means for real time wagering of said first real world contested event.

2. The wagering server system according to claim 1 wherein said system further comprises:

a. said game play component comprising an individual type component; a group type component;

b. said individual type component configured to represent a single object in said first real world contested event;

c. said group type component configured to represent a group of objects in said first real world contested event.

3. The wagering server system according to claim 2 wherein said system further comprises: said individual type component configured to initialize into an interactive playing card component configured to receive a readable data signal from an interactive playing card.

4. The wagering server system according to claim 3 wherein said system further comprises: said sensory application receiving from said interactive playing card a readable data component signal and transmitting said data component signal to said interactive playing card component.

5. The wagering server system according to claim 2 wherein said system further comprises: said group type component configured to initialize into an interactive playing card deck component configured to receive a plurality of readable data signals from an interactive playing card deck.

6. The wagering server system according to claim 3 wherein said system further comprises: said interactive playing card further comprises:

d. a front face and a back face, said front face comprising a suit card element, a face value card element, a readable data component;

e. said readable data component correlated to said suit card element and said face value card element;

f. said readable data component interoperating with a first sensor said first sensor configured to interoperate with said sensory application.

7. The wagering server system according to claim 2 wherein said system further comprises: said interactive playing card deck further comprises:

a. a plurality of interactive playing cards for use in a game;

b. each of said interactive playing cards comprising: a front face and a back face, said front face comprising a suit card element, a face value card element, a readable data component; said readable data component correlated to said suit card element and said face value card element; said readable data component interoperating with a first sensor said first sensor configured to interoperate with said sensory application.

8. The wagering server system according to claim 2 wherein said system further comprises: said game play component further comprising: a description component; an ID component; an open time component; a close time component; a location ID component; an event ID component; a sub event ID component; a player ID component; a wager ID component; a pool ID component.

9. The wagering server system according to claim 1 wherein said system further comprises: said wagering application further configured to display on a viewer said face card element and said suit card element of said first interactive playing card for entertainment of a group of spectators.

10. The wagering server system according to claim 3 wherein said sensory system further comprises:

a. a game table for playing a game, said game table comprising a first group of participants, said first group of participants comprising a first player, a dealer;
b. said game table further comprising a first sensor maintained at a dealer position; a second sensor maintained at a first player position;
c. said plurality of sensors configured to interoperate with a first readable data component maintained on said first interactive playing card;
d. said first readable data component comprising a suit card element, a face card element; said suit card element correlated to the suit of said first interactive playing card, said face card element correlated to the face value of said first interactive playing card.

11. The wagering server system according to claim 1 wherein said system further comprises:

a. said wagering application further configured to arrange said first set of individual entrant components and said first set of group entrant components based on said player entrant attributes;
b. said wagering application further configured to administer a plurality of wagering components comprising a wager ID attribute, a wager ID ticket number attribute, a player entrant wager ID number attribute, a wager amount attribute;
c. said plurality of wagering components configured for maintaining wager information as applied to each of said first plurality of player entrant components;
d. wherein any number of entrants in said contested event can have any number of wagers during a wagering event.

12. The wagering server system according to claim 6 wherein said system further comprises: said readable data component further comprises: a one dimensional barcode.

13. The wagering server system according to claim 6 wherein said system further comprises: said readable data component further comprises: a two dimensional barcode.

14. The wagering server system according to claim 6 wherein said system further comprises: said readable data component further comprises: a client element, a print element, a card deck element, a card deck placed into inventory element, a card deck retired from inventory element.

15. The wagering server system according to claim 6 wherein said system further comprises: said readable data component further comprises an assigned table element, a date pack is opened element, an assigned card game element, a number of deals per deck element, a date pack is retired element, a date of destruction element, a date of sale of used deck element.

16. The wagering server system according to claim 6 wherein said system further comprises: said readable data component further comprises a three dimensional barcode.

17. The wagering server system according to claim 6 wherein said system further comprises: said readable data component further comprises: a client element, a print element, a card deck element, a card deck placed into inventory element, a card deck retired from inventory element.

18. The wagering server system according to claim 6 wherein said system further comprises: said readable data component further comprises: an assigned table element, a date pack is opened element, an assigned card game element, a number of deals per deck element, a date pack is retired element, a date of destruction element, a date of sale of used deck element.

19. The wagering server system according to claim 6 wherein said system further comprises: said readable data component further comprises: a passive RFID tag.

20. The wagering server system according to claim 19 wherein said system further comprises: said passive RFID tag further comprises a tag size of about 50 microns to about 0.100 microns.

21. The wagering server system according to claim 19 wherein said system further comprises: said passive RFID tag further comprises a tag size of about a microchip.

22. The wagering server system according to claim 6 wherein said system further comprises: said readable data component further comprises: an active RFID tag.

23. The wagering server system according to claim 22 wherein said system further comprises: said active RFID tag further comprises a tag size of about 50 microns to about 0.100 microns.

24. The wagering server system according to claim 22 wherein said system further comprises: said active RFID tag further comprises a tag size of about a microchip.

25. The wagering server system according to claim 6 wherein said system further comprises: said readable data component further comprises a nano tag.

26. The wagering server system according to claim 6 wherein said system further comprises: said readable data component further comprises a client element, a print element, a card deck element, a card deck placed into inventory element, a card deck retired from inventory element.

27. The wagering server system according to claim 6 wherein said system further comprises: said readable data component further comprises: an assigned table element, a date pack is opened element, an assigned card game element, a number of deals per deck element, a date pack is retired element, a date of destruction element, a date of sale of used deck element.

28. The wagering server system according to claim 6 wherein said system further comprises: said readable data component further comprises: a first data component and a second data component.

29. The wagering server system according to claim 28 wherein said system further comprises: said first data component further comprises one of the following: a one-dimensional barcode, a two-dimensional barcode, a three-dimensional barcode, an RFID tag.

30. The wagering server system according to claim 28 wherein said system further comprises: said second data component further comprises one of the following: a one-dimensional barcode, a two-dimensional barcode, a three-dimensional barcode, an RFID tag.

31. The wagering server system according to claim 28 wherein said system further comprises: said first data component further comprises: an RFID tag; said second data component further comprising one of the following: a one-dimensional barcode, a two-dimensional barcode, a three-dimensional barcode, an RFID tag.

32. The wagering server system according to claim 6 wherein said system further comprises: said first sensor further comprises: a laser scanner configured to read a one dimensional bar code.

33. The wagering server system according to claim 6 wherein said system further comprises: said first sensor further comprises: a digital imager configured to read a two dimensional bar code.

34. The wagering server system according to claim 6 wherein said system further comprises: said first sensor further comprises: a three-dimensional surface reader configured to read a three dimensional bar code.

35. The wagering server system according to claim 6 wherein said system further comprises: said first sensor further comprises: a radio frequency ID reader configured to receive a radio signal from an RFID tag.

36. The wagering server system according to claim 7 wherein said sensory system further comprises:

a. said interactive playing card deck further comprises 52 interactive playing cards including said first interactive playing card;

b. a dealer activating said first deck of interactive playing cards by registering said interactive playing card deck with said first sensor.

37. The wagering server system according to claim 10 wherein said system further comprises:

a. said game table comprising a nine sided game table;

b. said first group of participants comprising nine participants;

c. said real world event further comprising the World series of poker;

d. wherein utilization of said sensory system in operation with said wagering application enables wagering on a sub event occurring during said real world contested event.

38. The wagering server system according to claim 36 wherein said sensory system further comprises:

a. an interactive player hand comprising at least one interactive playing card from said interactive playing card deck;

b. said at least one interactive playing card read by said second sensor maintained at a player position;

c. said second sensor sending said sensory application at least one readable data component digital signal for recording of at least one suit card element and at least one face card element of said first interactive player hand in said wagering application.

* * * * *